United States Patent
Beresnikow

[11] 3,757,169
[45] Sept. 4, 1973

[54] DYNAMIC GROUND DETECTOR

[75] Inventor: Victor Beresnikow, Arnprior, Ontario, Canada

[73] Assignee: Canadian Stackpole Ltd., Arnprior, Canada

[22] Filed: May 15, 1972

[21] Appl. No.: 253,118

[52] U.S. Cl. ......... 317/18 R, 317/27 R, 317/33 SC, 317/60 A, 324/51, 340/255, 340/256
[51] Int. Cl. ............................................. H02h 3/26
[58] Field of Search ................... 317/27, 53, 33 SC, 317/43, 60 A, 18 R; 324/51; 340/255, 256

[56] References Cited
UNITED STATES PATENTS

| | | | |
|---|---|---|---|
| 3,666,993 | 5/1972 | Legatti | 340/255 X |
| 2,991,397 | 7/1961 | Place | 340/255 X |
| 2,999,231 | 9/1961 | Kusters et al. | 324/51 X |
| 3,066,284 | 11/1962 | McKinley et al. | 324/51 X |
| 3,569,826 | 3/1971 | Burnett | 324/51 |

*Primary Examiner*—James D. Trammell
*Attorney*—Douglas S. Johnson

[57] ABSTRACT

A dynamic ground detector for monitoring a two-wire power distribution system, where both sides are nominally isolated from ground. A sampling bridge is connected between the lines, each shunt section of the bridge comprising a resistor and a capacitor having impedances in quadriture at the line frequency; and the junctions of the shunt sections of the sampling bridge are alternatively sampled by a switching network. The switching network connected through a phase shifting network comprising an RC filter to a detector network comprising a fullwave rectifier with suitable indicator and alarm apparatus. The rate of sampling is a multiple, including unity, of the line frequency.

Additional circuitry may also be provided for sensing the direction and phase of any fault current caused by a fault to ground from either or both of the lines, so that the fault current may be opposed by insertion of another current having the same phase and opposite direction.

11 Claims, 14 Drawing Figures

DYNAMIC GROUND DETECTOR

FIELD OF THE INVENTION

This invention relates to an apparatus for monitoring an electric power distribution system wherein both sides of a two-wire system are isolated from ground, and for detecting incipient ground faults within that system. In general, the invention teaches a ground detector which will give an indication, cause an alarm to operate, or otherwise as may be desired, when any fault to ground having less than a predetermined impedance, either balanced or unbalanced, may occur.

The invention broadly teaches an apparatus which is essentially a "dynamic" ground detector, in the sense that it provides a substantially continuous monitoring of each of the lines or sides of the otherwise ungrounded or isolated two-wire system.

BACKGROUND OF THE INVENTION

Prior art ground detectors include those taught in Kusters et al., U.S. Pat. Nos. 2,999,231, dated Sept. 5, 1961 and 3,066,284, dated Nov. 27, 1962, and Burnett U.S. Pat. No. 3,569,826, dated Mar. 9, 1971. Each of the Kusters et al. patents teaches a ground detector for electrical distribution systems which requires a vectorial addition of bridge voltages with respect to their Thevenin equivalent voltages; and each utilizes an electromechanical device for line sampling. The Burnett patent is particularly related to a ground fault detector which utilizes phase sensitive bridge detector means in parallel so as to detect balanced ground faults.

Reference is also made to N.L. Kusters "The Ground Detector Problem in Hospital Operating Rooms," N.R.C. Paper No. 4,591, National Research Council of Canada (see *Transactions* of the Engineering Institute of Canada, Volume 2, No. 1, January 1958); and J.A. Hopps "Shock Hazards in Operating Rooms and Patient Care Areas," N.R.C. Paper No. 10,813 (see Anaestheology, Volume 31, No. 2, August 1969).

Various standards have been established with respect to monitoring and detection of unsafe electrical grounding, especially with respect to hospital operating rooms where anaesthetics are administered; and Hopps discusses the necessity of adequate monitoring for incipient ground faults, not only in operating rooms, but in patient-care areas. Thus, as more portable equipment is being used in operating and patient-care areas, and as more electrical distribution systems are therefore isolated from ground so as to reduce shock hazards and to protect both the equipment, the personnel handling it, and the patients, the necessity for ground monitoring and detection apparatus having specific alarm levels within ranges that can be predetermined becomes greater. In addition, the necessity for ground detection apparatus having alarm capabilities, and which will be operative both with respect to balanced and unbalanced faults of varying sorts within predetermined alarm ranges, and with specific hazards, is greatly increased.

The ground detectors of the prior art have taken into account that a "Hazard Index" may quantitatively be expressed in milliamperes, and having regard to the various standards which have been set therefor — particularly with respect to hospital operating rooms — ground detectors have been designed having a "Total Hazard Index," and alarm capabilities, as required. However, the Total Hazard Index includes the "Hazard Index" of the system, and the "Detector Hazard Index;" that is to say, the Total Hazard Index — which is an expression of the total permissible current which would be permitted to pass from the isolated electrical distribution system through equipment attached thereto, and thence to the patient or personnel — includes the total hazards which are incipient or may have occurred in the system together with the hazard which is created by the presence of the detection apparatus connected to the system and from each line thereof to ground. Hopps shows that current as low as 0.8 milliamperes may be objectionable, and that currents above 9 mA may be such that a person through whose body such current is passing may not be able to "let-go." In any event, most of the installation standards (most notably, the National Fire Protection Association in its standard NFPA No. 56A, 1971) now require Total Hazard Indices of not more than 2 mA, including a Systems Hazard Index of 1 mA and a Detector Hazard Index of 1 mA. The alarm levels are related to the detected impedance to ground within the system, and are therefore related to the incipient ground fault conditions as they may occur and as they are detected using ground detection and monitoring apparatus. For example, where the line voltage is normally 120 volts, an alarm level of approximately 120 Kohms may be set so as to establish a System Hazard Index of 1 mA. However, it has now been found that much more sensitive monitoring and detection apparatus than has previously been used can be used in a dynamic ground detector, as thought in the present invention; with the result that the Total Hazard Index can be substantially decreased. For example, for an installation standard requiring alarm at a System Hazard Index of 1 mA and permitting a Detector Hazard Index of 1 mA, an equi-sensitive detector according to this invention can be provided having an alarm level at 1 mA and a Detector Hazard Index of 300 a for a Total Hazard Index of 1.3 mA — or a reduction of better than 30 percent in Total Hazard Index (or nearly 70 percent in the permanently connected Detector Hazard Index) over the prior art devices meeting the same installation standards.

Many of the prior art ground detector devices have been incapable of giving an alarm in the event of balanced faults. For example, a simple detector comprising a centre-tapped resistor connected between the isolated lines of a distribution system, and a larger resistor in series with a sensitive AC relay between the centre tap and ground, is unable to detect balanced ground faults, no matter how severe thay may be. Other prior art ground detectors have provided means for detecting various types of faults, balanced and unbalanced, and from 0° phase difference to 90° lagging phase difference (the likelihood of inductive resistive faults in isolated distribution systems in hospitals and the like being, in all practical terms, nil); but it has been necessary to accommodate a high Detector Hazard Index in order to provide a detector which would sense all balanced and unbalanced faults or resistive, capacitive or resistive/capacitive nature.

SUMMARY OF THE INVENTION

It is an object of this invention to provide a ground detector for electrical distribution systems which will operate, in accordance with any requisite installation standard for such systems in hospital operating rooms and the like, having substantially equi-sensitive detection of balanced and unbalanced faults and a substantially lower Detector Hazard Index when compared with the prior art dynamic ground detectors.

Another object of this invention is to provide a dynamic ground detector whose sensitivity to balanced faults and single faults may be equalized.

Yet a further object of this invention is to provide a greatly simplified and more reliable dynamic ground detector, having fewer components than prior art detectors, with no moving parts.

A still further object of this invention is to provide a dynamic ground detector which has essentially continuous sampling of the isolated sides of a two-wire power distribution system, and where the sampling is such that the shunt impedances of a bridge which is connected between sides of the system are alternately sampled at a rate which is a multiple, including unity, of the line frequency of the system.

A still further object of this invention is to provide a dynamic ground detector including fault compensation whereby a current of opposite direction and the same phase angle as a fault current can be inserted into the power distribution system so as to cancel at least some of the faulting currents detected therein.

BRIEF DESCRIPTION OF THE DRAWINGS

These and objects and features of the invention are more fully discussed hereafter in association with the accompanying drawings, in which.

DESCRIPTION OF THE PREFERRED EMBODIMENTS

Figure 1:
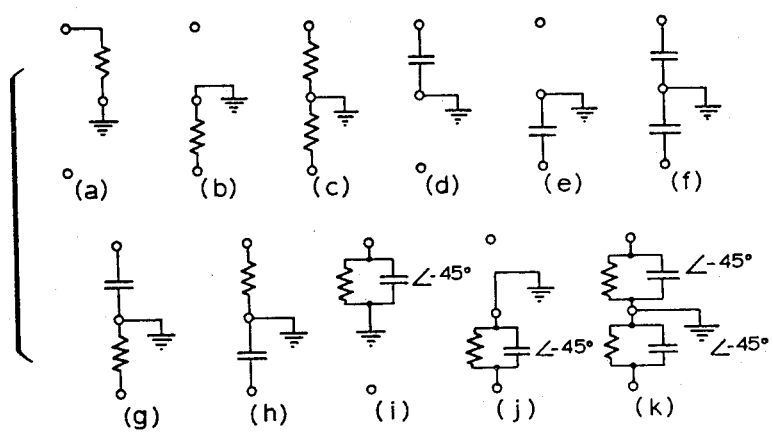
FIG. 1a to 1k shows 11 configurations of possible faults to ground which may occur in a two-conductor power distribution system.

Various possibilities of the sort of ground faults which are normally found in a hospital operating room or patient care area are shown generally in FIG. 1. Such faults may include single resistive faults as in $a$ or $b$, balanced resistive as in $c$, single capacitive as in $d$ or $e$, balanced capacitive as in $f$, hybrid as in $g$ or $h$, single RC as in $i$ or $j$, or balanced RC as in $k$. As indicated previously, the likelihood of inductive or inductive-resistive faults in hospitals and at 60 Hz have been found, for all practical considerations, to be nil.

Figure 2:
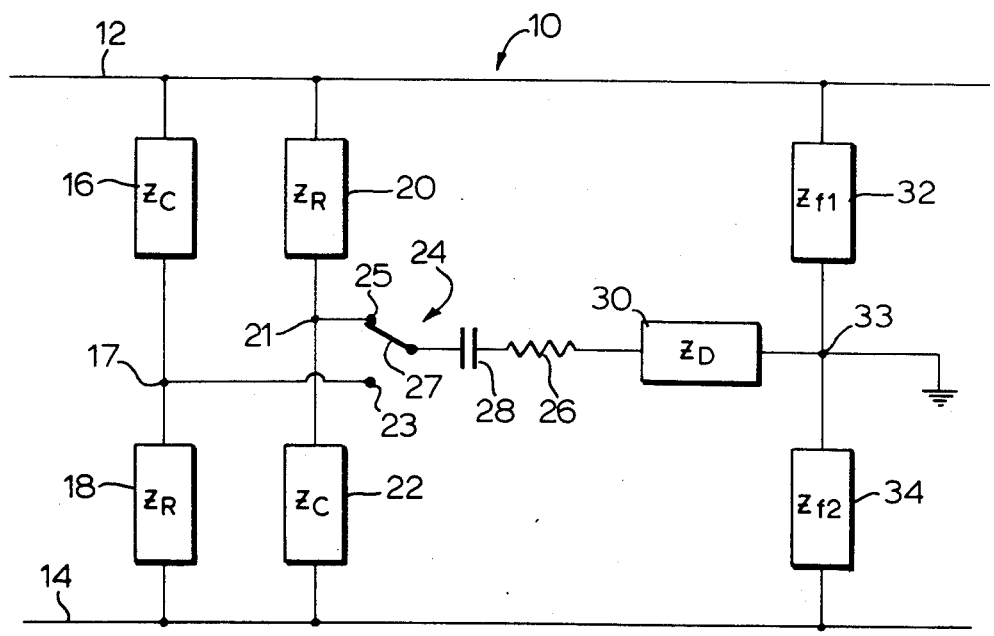
FIG. 2 is a block diagram showing the functional operation of a dynamic ground detector in accordance with the present invention.

Turning to FIG. 2, a ground detector is indicated generally at 10, and is situated between isolated power lines 12 and 14. A bridge network comprising impedances 16, 18, 20 and 22 is connected between power lines 12 and 14. Impedances 16 and 22 are indicated to have an impedance Zc, and impedances 18 and 20 are indicated to have an impedance Zr. The junction between impedance 16 and 18 is indicated at 17, and the junction between impedances 20 and 22 is indicated at 21.

Figure 3:
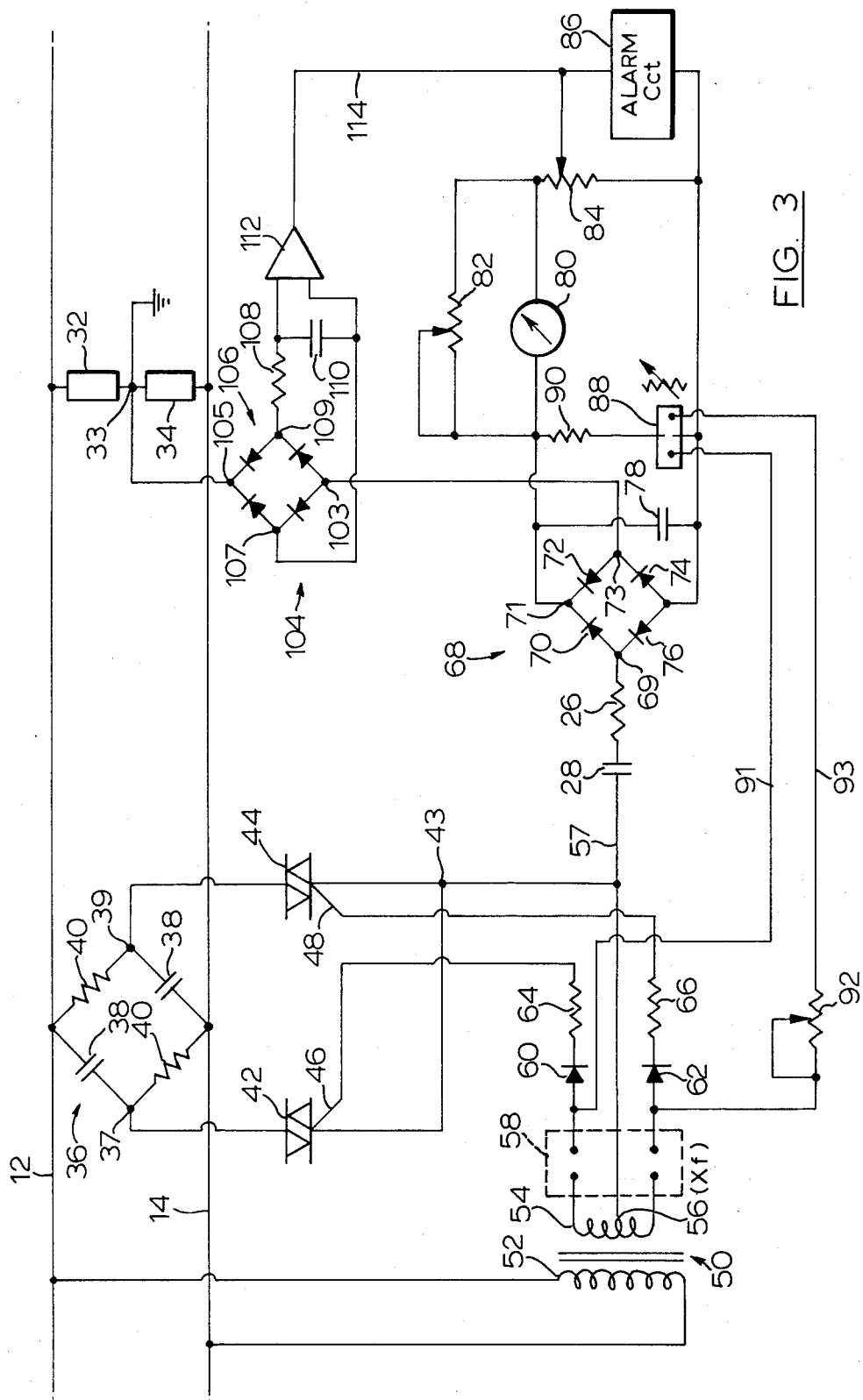
FIG. 3 is a schematic circuit of a typical dynamic ground detector in accordance with this invention, and, FIG. 4 is a block diagram showing the functional arrangement and operation of a dynamic ground detector including fault compensation, in accordance with this invention.

A switching arrangement is indicated generally at 24, and a practical embodiment of the bridging arrangement 24 is discussed hereafter in association with FIG. 3. For purposes of the present discussion, however, the switching arrangement 24 may be considered to be a single-pole, double-throw switch having switching points 23 and 25 connected to junctions 17 and 21 respectively, and also having a switching element 27 movable between the switching points 23 and 25 to effect a switching action therebetween. A resistor 26 and a capacitor 28 are connected in series with the switching device 24, and in series with a detector circuit indicated generally at 30. The detector circuit 30 is connected to ground; and the detector circuit 30 is shown as having an impedance Zd.

Also shown in FIG. 2 are two further impedances 32 and 34 connected to ground from lines 12 and 14 respectively. Because they are connected to ground, impedances 32 and 34 are therefore also connected to the detector 30. Impedances 32 and 34 represent any of the impedances to ground which may be the result of a fault to ground, or of an incipient fault to ground, and may be such as any of the faults shown in FIG. 1. Impedances 32 and 34 are shown as having impedances $Z_{f1}$ and $Z_{f2}$ respectively.

In general terms, as the switching device is switched between junctions 17 and 21, and where there is no ground fault, a current flows through the detector circuit 30 as a result of the connection between lines 12 and 14 of impedances Zc and Zr, as well with respect to the impedances of resistor 26 and capacitor 28 and impedances Zd of the detector circuit. In any event, a finite current flows through the detector 30, each time it is connected to either of junctions 17 or 21. However, if a ground fault occurs, having an effect identical to the connection of either or both of the impedances 32 and 34, the value of the current flowing through the detector 30 may be changed. As discussed hereafter, the values of resistor 26 and capacitor 28 are chosen so that, especially when bridge detection is used, balanced faults can be detected. Normally, the speed or rate at which the switching device 24 operates is a multiple, including unity, of the line frequency; ie., the single pole of switching device 24 throws from one position to the other once or an integral number of times per half cycle of the line frequency.

Turning now to FIG. 3, there is shown a representative schematic circuit of a dynamic ground detector in accordance with this invention. The ground detector is connected between a pair of lines 12 and 14, as before. The sampling bridge 36 includes capacitors 38 and resistors 40, and has junctions 37 and 39 between the capacitor 38 and resistor 40 shunts in the left and right sides of bridge 36, respectively. Junction 37 is connected to a bi-directional gate-controlled solid state device 42, and junction 38 is connected to a similar device 44. In practice, each of the bi-directional gate-controlled solid state devices 42 and 44 is a triac. The sides of each of the solid state devices 42 and 44 remote from junction 37 and 39 are connected together, and form a junction indicated at 43. Each of the solid state devices 42 and 44 is gated by a gating voltage derived in a manner discussed hereafter, and the gating voltages are applied at a gate connection of each device indicated at 46 and 48 respectively.

In the usual case, the values of the resistors 40 and the capacitors 38 are chosen so that all of the resistors and capacitors have substantially identical impedances; with the impedances of the resistors and capacitors being in quadrature. Thus, the voltage at junctions 37 and 39 at any time is substantially 0.707 times the line voltage between lines 12 and 14 at that time, and the current at either of junctions 37 or 39 leads the line voltage by 45°. As to the real values of resistance and capacitance, in a practical circuit they have been chosen at 10 Kohms and 0.27 μfarad respectively, so that the absolute impedance in each case, and at 60 Hz is 10 Kohms, and the impedance of either shunt circuit which comprises a capacitor 38 and resistor 40, at 60Hz is 10K $\sqrt{2}$ ∠−45° ohms.

In the embodiment shown in FIG. 3, a stepdown transformer 50 having primary winding 52 and secondary winding 54 is provided. The secondary winding 54 has a centre tap 56 which is connected by line 57 to resistor 26 in series with capacitor 28. A frequency multiplier is indicated by dashed lines at 58; and in any event may be considered to be present as a multiplier having a factor of unity. Diodes 60 and 62 provide two sources of voltage which are 180° out of phase with one another, and are connected through resistor 64 and 66 respectively to gate connections 46 and 48 of the bi-directional gate-controlled solid state switching devices 42 and 44 respectively. The frequency multiplier 58 may also be a multi-vibrator or chopper.

It will be noted that at least one of the solid state devices 42 and 44 is turned on once or more times per half cycle of the line frequency. Thus, junction points 37 and 39 of the sampling bridge 36 are connected through solid state devices 42 or 44 to the junction 43, and thence via line 57 to the resistor/capacitor network 26, 28 to a detector circuit indicated generally at 68. It will be noted that the rate of connecting the junction points 37 and 39 to detector circuit 68 is a multiple, including unity, of the line frequency of lines 12 and 14. The sampling network illustrated in FIG. 3 is, therefore, entirely comprised of solid state devices without any electromechanical devices; and operates at a rate which is controlled by/or related to the line frequency.

It is important to note that the use of line frequency to control the sampling rate precludes any possibility of low frequency "beats" of peaking voltage through the detector circuit. It has been found, in prior art devices, that the low frequency "beats" which occur when the sampling rate is different by other than a multiple of the line frequency have been or can be irretiting to any person who comes in contact with them.

The detector circuit 68 includes a fullwave rectifier bridge, having rectifiers 70, 72, 74 and 76, and junctions 69, 71, 73 and 75. Rectifier 70 is connected between junctions 69 and 71, and so on in sequence throughout the bridge. A filter capacitor 78 is connected across the bridge from junction 71 to 75; capacitor 28 is connected to junction 69 of the bridge and junction 73 of the bridge is connected to ground. An indicator 80 with an appropriate calibration or sensitivity shunt 82 is also connected across the bridge; and in the circuit of FIG. 3, a variable resistor 84 is shown in series with the indicator 80 for a purpose to be discussed hereafter.

Impedances 32 and 34 with a junction 33 between them are shown between lines 12 and 14, with junction 33 connected to ground. Thus, the bridge comprising impedances 16, 18, 20 and 22 in FIG. 2 is the equivalent of sampling bridge 36 in FIG. 3; the switching device 24 is the equivalent of the sampling network including solid state devices 42 and 44, diodes 60 and 62 etc.; the detector arm 30 is replaced by the fullwave rectifier bridge shown in FIG. 3 and is connected to ground, with resistor 26 and capacitor 28 between the sampling network and the detector network. In a first half cycle, the current path through the fullwave rectifier bridge may be from junction 69 to junction 71, while in the other half cycle the current path would be from junction 69 through junction 73 and 71, to indicator 80.

The values of resistor 26 and capacitor 28 are normally chosen so that the phase angle of the RC filter formed thereby is other than 45°. Thus, balanced faults can be readily detected in the detector circuit, as discussed hereafter.

If the phase angle of the RC filter comprising resistor 26 and capacitor 28 is 45°, then the sampling voltage which is between junctions 69 and 73, would have a phase angle of 45° if a balanced capacitive or hybrid fault occurs at impedances 32 and 34, and in that case the bridge would be non-conductive. Normally, the values of the resistor 26 and capacitor 28 are chosen so that the impedance angle is very highly lagging, normally in the order of 81° lagging. The capacitive impedance is, of course, much greater than the resistive impedance in that case; and in a practical example as discussed above, the value of resistor 26 may be 16 Kohms and the value of capacitor 28 may be 0.01 μ farads when the line frequency is 60 Hz.

The current from the sampling bridge 36 is essentially a squarewave when it has passed through resistor 26 and capacitor 28; and thus the bridge which is connected to ground is adapted to continuously pass any signal which arrives at junction 69 to the indicator 80. The phase angle of such signal at junction 69 is, of course, different than the phase angle of a signal derived from either of junctions 37 or 39 of the sampling bridge 36.

The variable resistor 84 is intended to be used as a variable tap or trigger adjust for an alarm circuit indicated at 86. Current passing through the indicator 80 also passes through the resistor 84, and it can be seen that the alarm circuit can be adjusted by setting variable resistor 84 so that the alarm is triggered at a predetermined level. The alarm 86 may include amplifiers, light indicator means, audible alarms, etc. It is only necessary to note that a preset or predetermined amount of current passing through the indicator 80 and the resistor 84 will trigger the alarm circuit 86. Thus, the detector network 68 is operable to determined the amount of ground fault or incipient ground fault connected between lines 12 and 14, and to cause alarm means to be operable at a predetermined level as the amount of fault current flowing from either or both of lines 12 and 14 to ground reaches a predetermined level.

A shunt 88 in series with resistor 90 is also provided across junction 71 and 75 of the fullwave rectifier bridge in detector network 68. Shunt 88 has a variable impedance which is dependent on the line voltage between lines 12 and 14 of the power distribution system being monitored by the invention of this application, and may be operable to accommodate line voltage changes in the range of +10 percent to −15 percent. Line voltage changes can otherwise be misleading, because adjustment and calibration of the alarm and trigger circuits for a given line voltage may cause the alarm to be operable either too late or too early depending on the excursion of the line voltage from where it was when the adjustment or calibration was made.

The shunt 88 may take the form of a thermo-resistor or light sensitive resistor, and in any event the impedance of the shunt 88 may be made to alter substantially in direct proportion to a change in line voltage — at least over a given range — by connection to the line voltage either directly or through a transformer. In the circuit shown in FIG. 3, lines 91 and 93 connect to the secondary winding 54 of transformer 50 and a variable resistor 92 may be provided to adjust the range of linear operation of the shunt 88.

(Operation of the dynamic ground detector such as that illustrated in FIG. 3 to an alarm status so that alarm 86 operates to cause visible and/or audible alarms does not necessarily mean that the operative or other surgical or medical procedures being carried out will cease; but sufficient notice is given by the alarm circuit to the appropriate personnel that danger to them or to the patient or equipment may be imminent. Quantitative analysis of the ground fault which may have occurred may be determined from indicator 80, or otherwise depending on the precise manner in which that indicator or another indicator may be arranged within the circuit. It has been noted that it is a major purpose of a ground detector to note incipient faults to ground in an otherwise nominally isolated power distribution system when the faults to ground have an impedance and therefore a current level for a given line voltage such that damage or harm to the patient, personnel or equipment can be minimized. Thus, an audible alarm in alarm circuit 86 may sound when the system hazard index reaches a predetermined alarm level, and the audible alarm might be disabled and the operative or other patient-care procedure continued. At a later time, a thorough study of all of the equipment being used would probably be required to find the cause of the fault to ground.)

Figure 4:
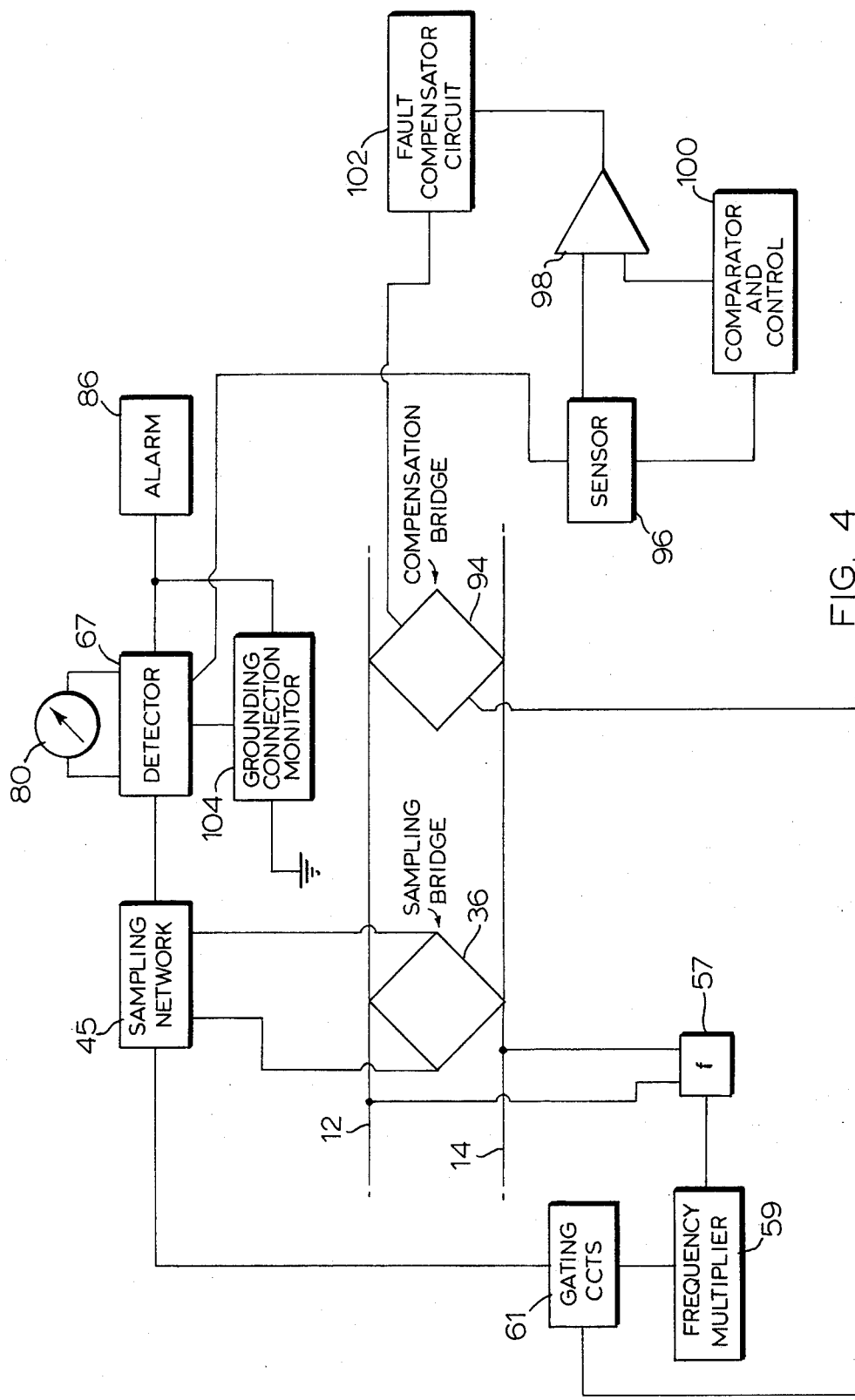

FIG. 4 is a block diagram of a circuit which includes a sampling bridge 36 connected between lines 12 and 14, and connected to a sampling network 45. The sampling network 45 is gated from gating circuits 61, which inturn is driven from a frequency multiplier 59. The frequency multiplier 59 may be driven from a frequency source 57 which is connected to lines 12 and 14 so that the gating rate — ie., the gating voltage output from gating circuit 61 — is a multiple, including unity, of the line frequency. The gating circuit 61 may also be adapted to provide a gating voltage to a compensation bridge indicated at 94, which is also connected between lines 12 and 14. A detector 67 is driven from the sampling network 45, and has an indicator 80 across it. Detector 67 is connected to ground. Alarm 86 may also be driven from detector 67.

A sensing device or sensor 96 is also connected to detector 67, and it drives an amplifier and current inverter 98. A comparator and control circuit 100 is connected to the sensor 96 and the amplifier and current inverter 98; and the output of the current inverter is connected to a fault compensator circuit 102 which inturn drives the compensation bridge 94.

In operation, the phase and magnitude of the fault currents occurring between either or both of lines 12 and 14 in ground may be determined from the detector 67 by sensor 96. The sensor drives the amplifier and current inverter 98, which is also connected to the comparator and control circuits 100 so that fault compensator circuit 102 can be generated having the same phase angle and the opposite direction to the fault currents being sensed. The output from the fault compensator circuit is gated to the compensation bridge, usually at the same rate as the sampling network 45 is gated, and the fault current may be at least partially cancelled.

In yet a further embodiment of the dynamic ground detector of the present invention, a grounding detection monitor 104 may be interposed between the detector 67 and ground, as noted in FIG. 4. In other words, and as shown in FIG. 3, the grounding connection monitor 104 may be connected in series with the ground connection 73 of the detector circuit 68 and ground. The purpose of the ground connection monitor is to continuously monitor the connection of the dynamic ground detector to ground; and it is an alternative feature of the dynamic ground detector which provides additional means by which the users of the ground detector are assured that it is properly grounded, and is therefore monitoring the two-wire power distribution system for faults or incipient faults to ground.

The grounding connection monitor 104 may include a second detector network 106 having an output which is applied to an amplifier 112 whose output, in turn, is applied to the input of alarm circuit 86. The detector network 106 may conveniently comprise a rectifier network connected at points 103 and 105 to ground connection 73 of the rectifier network of detector circuit 68, and to ground, respectively. An RC filter comprising resistor 108 and capacitor 110 is across corners 107 and 109 of the rectifier bridge — the detector arm of the bridge — and the output of the filter is applied to the input of amplifier 112. The amplifier normally has a high input impedance so that it monitors the current flow through the bridge 106, and acts as a zero-current detector amplifier. In the event that the ground connection of the dynamic ground detector is lost, the output of the amplifier 112 would collapse, and the connection of that output by line 114 to the alarm circuit 86 and trigger 84 is such that, upon collapse of the output of amplifier 112, the alarm circuit is triggered to alarm status. Visual and audible alarm means — such as flashing lights, buzzers etc. — may be actuated by the alarm circuit 86 to warn users of the dynamic ground detector that the grounding connection has been lost.

There has been described an apparatus for monitoring a two-wire power distribution system, specifically a dynamic ground detector. The ground detector of the present invention has no electromechanical components; and provides a circuit whereby whenever a sampling current is fed to a detector circuit — usually through a phase changing filter — the sample is measured between the lines. The sensitivity of the dynamic ground detector of the present invention can be altered, and in any event can be set at a relatively low level compared to the prior art detectors so that the permanently connected detector hazard index can be greatly reduced, and correspondingly a higher system hazard index can be accommodated for any given total hazard index — as compared with the prior art devices. Balanced and unbalanced faults to ground can be detected using the apparatus of the present invention.

Several embodiments have been shown, including an embodiment providing fault compensation circuitry for at least partially cancelling the effect of fault currents to ground by countering them with currents of essentially equal magnitude and of the same phase but in the opposite direction.

Several examples have been given of component values in a typical working model of the dynamic ground detector of the present invention, but the specific values discussed are exemplary and are not intended as limiting in any way. It will therefore be appreciated that many modifications and amendments to apparatus according to this invention may be made while keeping within the spirit and scope of the appended claims.

What I claim is:

1. Apparatus for monitoring a two-wire power distribution system, where both sides of the system are nominally isolated from ground, and for detecting balanced and unbalanced faults to ground within the system, any such detected fault occurring within the system being a connection of an impedance between ground and at least one side of the system, comprising:

first and second pairs of impedances connected between the sides of said system, where each pair comprises a resistor and a capacitor whose value is chosen so that its impedance at the line frequency of the system is substantially equal to the impedance of the resistor; the first and second pairs of impedances being connected to the system so that the resistor of said first pair and the capacitor of said second pair are connected to one side of the system, and the capacitor of the first pair and the resistor of the second pair are connected to the other side of the system;

the junction points between the impedances of each of said first and second pairs of impedances being alternately connectable to a detector circuit through a sampling network; the rate of connecting said junction points to said detector circuit being a multiple, including unity, of the line frequency of said system;

means for changing the phase angle of any signal being fed to said detector circuit from said sampling network so that the phase angle of such signal is different than the phase angle of a signal derived from the junction point of either of said first or second pairs of impedances;

said detector circuit being connected to ground and including means for continuously feeding any signal derived through the sampling network from said system to said indicator means.

2. The apparatus of claim 1 wherein said sampling network includes a pair of bi-directional gate-controlled solid state devices, with a first end of each such device connected to the junction of one of said pairs of impedances, and a second end of each such device connected to said phase angle changing means; a gate connection of each of said devices being connected to a discrete source of gate voltage operable to make each such device conductive or non-conductive at a rate being a multiple, including unity, of the line frequency of said sytem.

3. The apparatus of claim 2 wherein said detector circuit includes a full-wave rectifier bridge connected between said phase angle changing means and ground, with indicator means connected across said bridge.

4. The apparatus of claim 1 further including: alarm means connected to said indicator means, trigger means to cause said alarm to be operable at a preset level of current in said detector circuit.

5. The apparatus of claim 2 wherein said detector circuit includes shunt means having a variable impedance dependent on the line voltage of said system, and connected across said indicator means so as to alter the sensitivity thereof substantially in direct proportion to a change of line voltage.

6. The apparatus of claim 2 where the voltage at each junction of said pair of impedances lags the current at that junction by substantially 45°, and the voltage of the signal applied to said detector circuit from said phase angle changing means lags the current of such signal by substantially 81°.

7. The apparatus of claim 2 further including: sensing and comparator means for determining the phase angle and direction of any current in said detector circuit.

8. The apparatus of claim 7 further including: means for inserting into said two-wire system a current of opposite direction and the same phase angle as the current in the detector circuit, said means comprising an amplifier and current inverter, a gated compensation bridge between said two lines of said system, and a source of gating voltage for said gating compensation bridge.

9. The apparatus of claim 8 where the gating voltage from said source of gating voltage is at the same rate as the gating voltage of said sampling network.

10. The apparatus of claim 4, further including a grounding connection monitor comprising:

a second detector network connected in series with the ground connection of the detector circuit and ground, the output of said second detector network being applied to amplifier means, and the output of said amplifier means being connected to said alarm means.

11. The apparatus of claim 10, wherein said second detector network is a rectifier bridge, and said amplifier is connected as a zero-current detector amplifier so that, on loss of ground connection by said detector circuit, said alarm means is triggered to alarm status.

* * * * *